United States Patent [19]
Marusue et al.

[11] Patent Number: 5,431,604
[45] Date of Patent: Jul. 11, 1995

[54] CONTROL SYSTEM FOR AUTOMATIC TRANSMISSION

[75] Inventors: Toshihisa Marusue; Hidehiko Mishima; Kazunori Enokido; Tatsutoshi Mizobe, all of Hiroshima, Japan

[73] Assignee: Mazda Motor Corporation, Hiroshima, Japan

[21] Appl. No.: 51,951

[22] Filed: Apr. 26, 1993

[30] Foreign Application Priority Data

Apr. 30, 1992 [JP] Japan .................. 4-139762

[51] Int. Cl.6 ........................... B60K 41/10
[52] U.S. Cl. ................... 475/123; 477/143; 477/149
[58] Field of Search .............. 475/123; 477/143, 144, 477/147, 148, 149, 155

[56] References Cited

U.S. PATENT DOCUMENTS

| | | |
|---|---|---|
| 3,400,613 | 9/1968 | Johnson et al. ............ 477/144 |
| 4,576,065 | 3/1986 | Speranza et al. ............ 477/94 |
| 4,852,006 | 7/1989 | Speranza .................. 477/78 |
| 4,916,979 | 4/1990 | Irwin ..................... 477/149 |
| 4,934,215 | 6/1990 | Miura et al. .............. 475/283 |
| 4,949,597 | 8/1990 | Ueki et al. ............... 477/143 |
| 5,131,298 | 7/1992 | Marusue .................. 477/144 |
| 5,274,553 | 12/1993 | Boardman ................. 477/78 |

FOREIGN PATENT DOCUMENTS

61-99745 5/1986 Japan .

Primary Examiner—Michael Koczo
Attorney, Agent, or Firm—Keck, Mahin & Cate

[57] ABSTRACT

In a control system for an automatic transmission, when successive order signals are emitted so that shift changes are accomplished over multiple shift stages, a shift change ordered by an initial order signal is carried out before a shift change ordered by a last order signal is carried out if a shift gear mechanism has already started its operation. However, a shift change ordered by a last order signal is carried out, without shift changes ordered by an initial order signal and intermediate order signals being carried out, if the shift gear mechanism has not started its operation.

3 Claims, 9 Drawing Sheets

CONTROL SYSTEM FOR AUTOMATIC TRANSMISSION

FIELD OF THE INVENTION

The present invention relates to a control system for an automatic transmission for use in an automobile and, in particular, to a control system for an automatic transmission in which shift stages are switched by hydraulic pressure.

BACKGROUND OF THE INVENTION

An automatic transmission generally used for an automobile has a torque converter to which engine power is input and a shift gear mechanism driven by the torque converter. In such a transmission, frictional elements are selectively engaged with each other to switch a power transmitting route and thereby establish a desired shift stage. The frictional elements are engaged with or disengaged from each other by an actuator driven by means of hydraulic pressure. Shift stages are switched by controlling hydraulic pressure.

Recently, an attempt to use multiple shift stages has been made to enhance a fuel consumption rate and engine output power. For instance, Japanese Unexamined Patent Public Disclosure (Kokai) No. 61-99745 discloses an automatic transmission in which a main transmission and a sub-transmission, each having independently operated shift gear mechanism are connected in series with each other. These two transmission are driven simultaneously or alternatively to thereby accomplish multiple shift stages.

In addition, U.S. Pat. No. 4,934,215 also discloses an automatic transmission attempting to accomplish multiple shift stages.

These conventional automatic transmissions have, stored therein, predetermined patterns for shift-changing with parameters of a vehicle speed and an engine load. Drive conditions, such as a vehicle speed and an engine load, are checked up with the shift-change patterns to determine whether a shift change should be done. Then according to the determination, a signal ordering a shift change is emitted to establish a desired shift stage. On shift-changing, successive order signals are sometimes emitted to accomplish shift changes over multiple shift stages, for instance, a first signal ordering 4-3 shift down, is emitted and, successively, a second signal, ordering 3-2 shift down, is emitted. It should be noted that hereinbelow a term "M-N shift down" or "M-N shift up" means a shift change from a M shift stage to a N shift stage, and a term "shift down" is used if M is greater than N while a term "shift up" is used if M is smaller than N.

When the successive order signals are emitted as aforementioned, it is usual that a shift change according to a first signal is first accomplished and then a shift change according to a second or later signals is accomplished. However, when such successive order signals are emitted in a short period of time, there arises a problem of response delay, namely time lag between an emission of an order signal and an actual start of a shift change due to response delay of frictional elements.

To solve this problem, a shift gear mechanism can be modified to be controlled so that when a new order signal is output, a shift change according to the new order signal is initially accomplished. However, this modification causes other problems such as, for instance, the problem of giving an uncomfortable feeling to a driver because frictional elements in the process of disengagement return to engagement.

In addition, the aforementioned modification makes a shift change system complicated if the system accomplishes a feed-back control during a shift change for engagement force of frictional elements. For instance, when an order signal indicating 3-2 shift down is emitted before 4-3 shift down has been completed, a shift change is accomplished so that a gear ratio is changed to one for 2nd shift stage while sensing the operation of a shift gear mechanism in real time. Thus, a shift change control cannot avoid being complicated.

In particular, a shift change control is complicated in an automatic transmission having two transmissions connected in series with each other. Each transmission has a shift gear mechanism driven independently of the other. When gear ratios have to be simultaneously changed in both the transmissions, change of a gear ratio in one transmission has to be harmonized with change of a gear ratio in the other transmission in order to prevent shock due to a shift change from occurring. This causes a shift change control to be more complicated than usual. In particular, when a gear ratio is to be increased in one transmission and a gear ratio is to be decreased in the other transmission, a shift change control is extremely complicated.

SUMMARY OF THE INVENTION

It is therefore an object of the present invention to solve the aforementioned problems. More particularly, the object of the invention is to provide a control system for an automatic transmission capable of accomplishing a shift change without giving an uncomfortable feeling to a driver even when order signals are successively emitted to accomplish shift changes over multiple shift stages.

In one aspect of the present invention, a control system for an automatic transmission includes a torque converter to which engine power is to be input, a shift gear mechanism for changing output of the torque converter to vary a vehicle speed, a plurality of frictional elements for switching a power transmitting route of the shift gear mechanism, a shift stage switching device for controlling hydraulic pressure to selectively engage the frictional elements with each other to switch shift stages, a shift change ordering device for emitting an order signal to establish a desired shift stage, a shift changing device for operating the shift stage switching device in accordance with the order signal to accomplish a shift change, a sensor for sensing operation of the shift gear mechanism, and an, order signal amending device for, when the shift change ordering device emits successive order signals so that shift changes are accomplished over multiple shift stages, making the shift changing device carry out a shift change ordered by an initial order signal and then a shift change ordered by a last order signal if the operation of the shift gear mechanism is sensed by the sensor, while making the shift changing device carry out a shift change ordered by a last order signal without carrying out shift changes ordered by an initial order signal and intermediate order signals if the operation of the shift gear mechanism is not sensed by the sensor.

In another aspect of the invention, a control system for an automatic transmission includes a torque converter to which engine, power is to be input, a main transmission having a first shift gear mechanism, the first shift gear mechanism selectively engaging frictional elements with each other among a plurality of frictional elements for switching a power transmitting route to thereby change output of the torque converter to vary a vehicle speed, a sub-transmission having a second shift gear mechanism, the second shift gear mechanism selectively engaging frictional elements with each other among a plurality of frictional elements for switching a power transmitting route to thereby change the output of the main transmission, a shift stage switching device for controlling hydraulic pressure to selectively engage the frictional elements with each other to switch shift stages, shift a change ordering device for emitting an order signal to establish a desired shift stage, shift changing device for operating the shift stage switching device in accordance with the order signal to accomplish a shift change, a sensor for sensing operation of the first and second shift gear mechanism, and an order signal amending device for, when the shift change ordering device emits successive order signals so that shift changes are accomplished over multiple shift stages, the order signals including one for accomplishing simultaneous shift changes both in the main transmission and sub-transmission, making the shift changing device carry out a shift change ordered by an initial order signal and then a shift change ordered by a last order signal if the operation of the corresponding shift gear mechanism is sensed by the sensor, while making the shift changing device carry out a shift change ordered by a last order signal without carrying out shift changes ordered by an initial signal and intermediate order signals if the operation of the corresponding shift gear mechanism is not sensed by the sensor.

In a preferred embodiment, the shift changing device controls shifting so that when increasing a gear ratio and decreasing a gear ratio are simultaneously to be accomplished in the main transmission and the sub-transmission, a shift change of the sub-transmission starts after a shift change of the main transmission starts and ends before the shift change of the main transmission ends, and the order signal amending device making the shift changing device carry out a shift change ordered by an initial order signal and then a shift change ordered by a last order signal if the operation of the corresponding shift gear mechanism is sensed by the sensor, while making the shift changing device carry out a shift change ordered by a last order signal without carrying out shift changes ordered by an initial signal and intermediate order signals if the operation of the corresponding shift gear mechanism is not sensed by the sensor, when the shift change ordering device emits successive order signals over multiple shift stages so that a shift change starting when a shift change of one of the main transmission and sub-transmission starts ends after the shift change to increase and decrease gear ratios in the main transmission and the sub-transmission ends.

In another preferred embodiment, the shift changing device controls shifting so that when a shift change to increase a gear ratio and a shift change to decrease a gear ratio are simultaneously to be accomplished in the main transmission and the sub-transmission, a shift change of the sub-transmission starts after a shift change of the main transmission starts and ends before the shift change of the main transmission ends, and the order signal amending device makes the shift changing device carry out a shift change ordered by an initial order signal and then a shift change ordered by a last order signal if the operation of the second shift gear mechanism is sensed by the sensor, while making the shift changing device carry out a shift change ordered by a last order signal without carrying out shift changes ordered by an initial signal and intermediate order signals if the operation of the second shift gear mechanism is not sensed by the sensor, when the shift change ordering device emits successive order signals over multiple shift stages so that a shift change, starting when the shift change to increase and decrease gear ratios in the main transmission and the sub-transmission starts, ends after a shift change of one of the main transmission and the sub-transmission ends.

In still another embodiment, three sensors are provided to sense numbers of revolutions of an input shaft of the main transmission, an output shaft of the main transmission and an output shaft of the sub-transmission.

According to the present invention, when a new order signal is emitted after a shift gear mechanism starts its operation according to a previously emitted order signal, a shift change is first accomplished according to the previously emitted order signal and then a shift change is accomplished according to the newly emitted order signal. Then a new order signal is emitted before a shift gear mechanism starts its operation, a shift change is accomplished according to the newly emitted order signal without accomplishing a shift change according to a previously emitted order signal. Thus, even when successive order signals are emitted at a short period of time to accomplish shift changes over multiple shift stages, a prompt and accurate shift change can be accomplished without giving an uncomfortable feeling to a driver. In particular, if the invention is applied to an automatic transmission in which a feed-back control of engagement force of frictional elements is accomplished during shift changes, it is possible to avoid a shift change control from being complicated and accomplish appropriate control in accordance with driving conditions of a vehicle.

The aforementioned advantages can be obtained also by the second aspect of the invention as well as the first aspect of the invention. In particular, in an automatic transmission in which a feed-back control is accomplished to harmonize change in a gear ratio of the main transmission with a change in a gear ratio of the sub-transmission, even if successive order signals are emitted to accomplish shift changes over multiple shift stages, these shift changes can be accomplished without any shock due to the shift changes.

The aforementioned preferred embodiments also provide the same advantageous effect as the invention mentioned above. Also, in an automatic transmission in which a feed-back control is accomplished to harmonize change in a gear ratio of the main transmission with change in a gear ratio of the sub-transmission, even if successive order signals are emitted to accomplish shift changes over multiple shift stages, these shift changes can be accomplished without shock due to the shift changes.

Further objects, features and advantages of the present invention will become apparent from the Detailed Description of Preferred Embodiments which follows when read in light of the accompanying Figures.

DETAILED DESCRIPTION OF THE PREFERRED EMBODIMENTS

Figure 1:
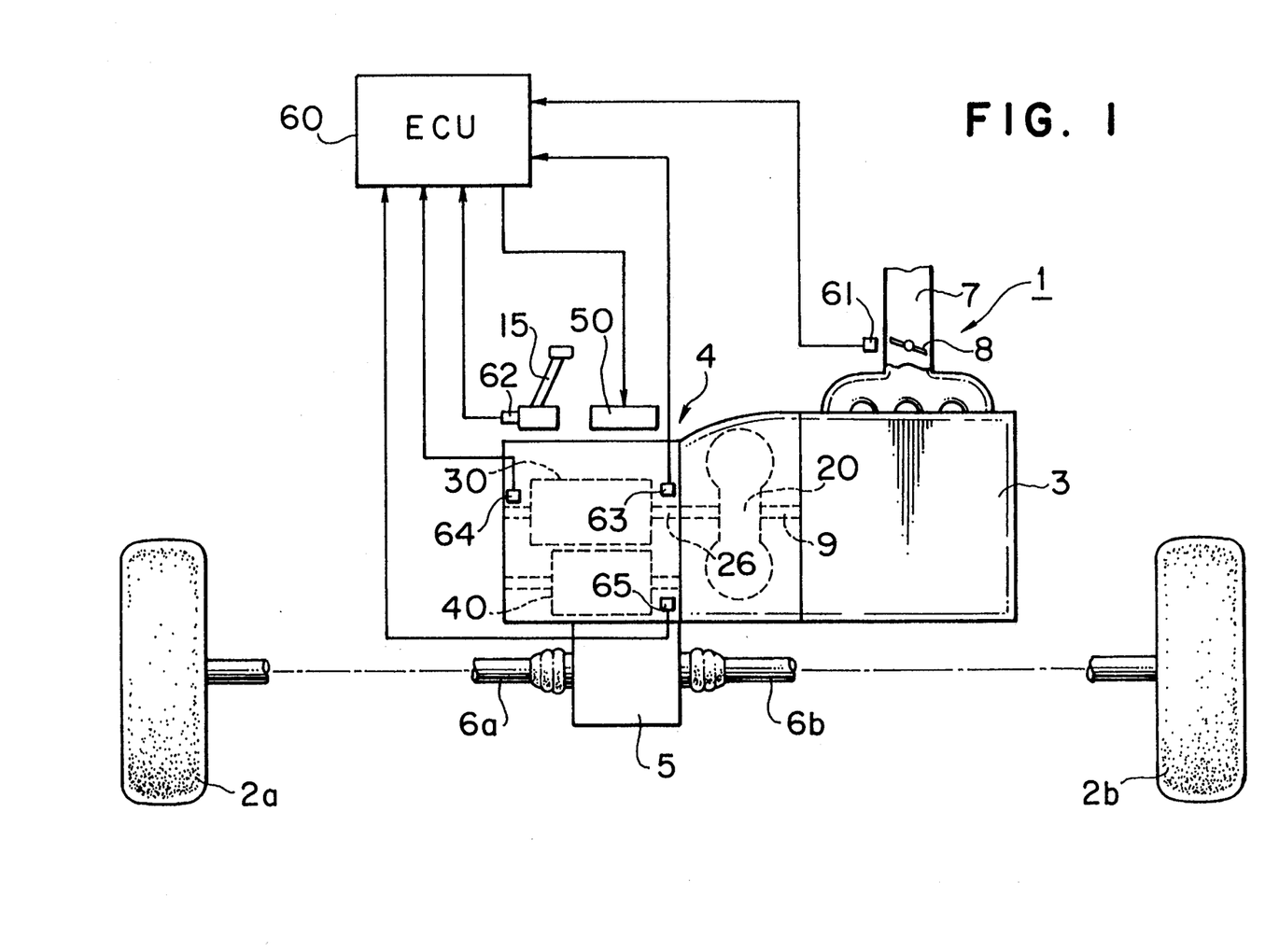
FIG. 1 is a schematic view of an automatic transmission to which a control system in accordance with the present invention can be applied.

Referring to FIG. 1, an automobile 1 to which the present invention is applied has a pair of drive front wheels 2a, 2b to which output torque of an engine 3 is transmitted from an automatic transmission 4 through a differential gear 5 and a pair of axle shafts 6a, 6b. In an intake air passage 7 leading to the engine 3 is disposed a throttle valve 8 for adjusting an amount of intake air or engine power.

Figure 2:
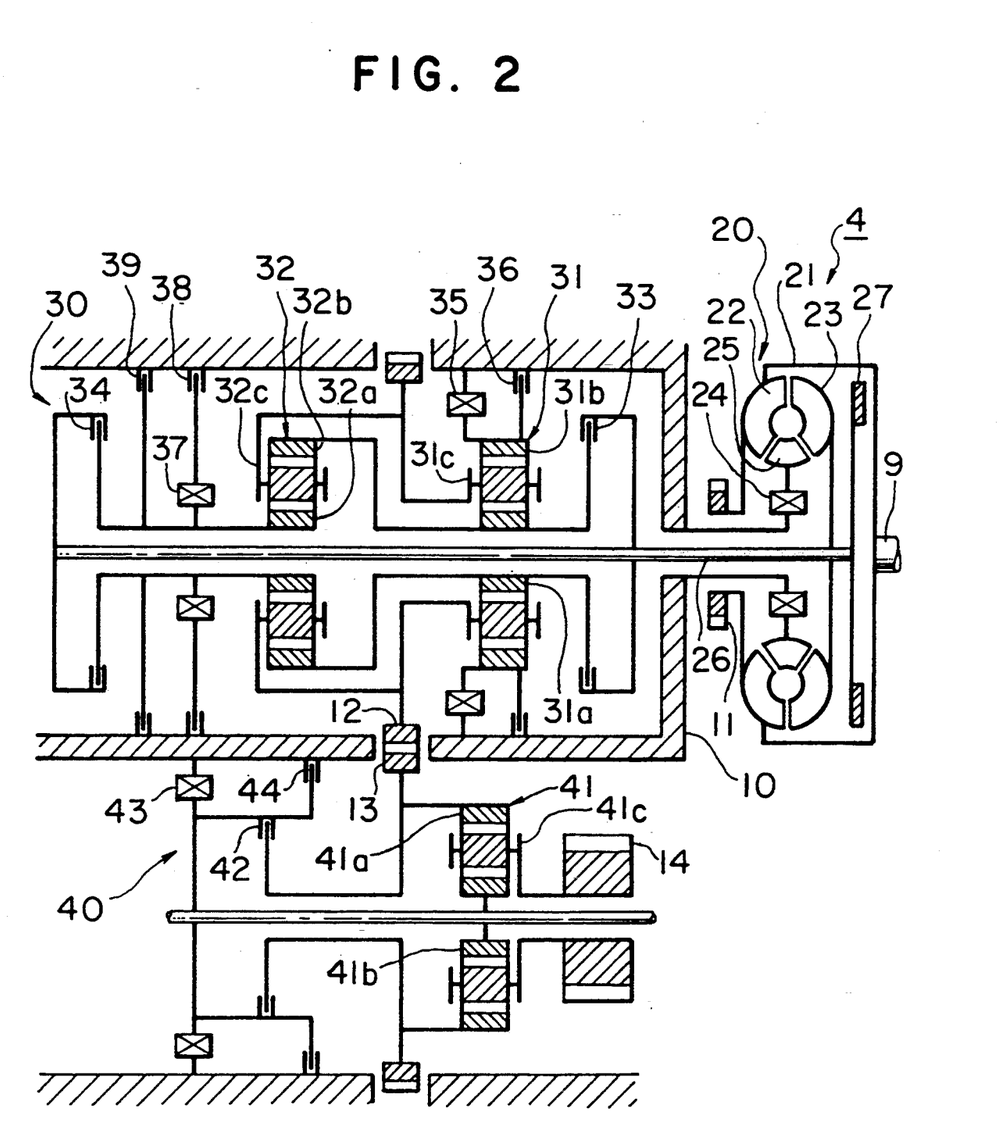
FIG. 2 shows details of the main transmission and the sub-transmission of the automatic transmission of FIG. 1.

As also illustrated in FIG. 2, the automatic transmission 4 includes a torque converter 20, a main transmission 30 disposed so that it has a common axis with the torque converter 20, a sub-transmission 40 disposed parallel with the common axis, and a hydraulic pressure controller 50 for controlling hydraulic pressure supplied to frictional elements disposed in the main transmission 30 and the sub-transmission 40, which together form a shift gear mechanism.

The torque converter 20 is provided with a pump 22 integral with a transmission case 21 connected with an output shaft 9 of the engine 3, a turbine 23 disposed facing the pump 22 and driven thereby through a hydraulic fluid, a stator 25 disposed between the pump 22 and the turbine 23 and carried by the converter case 10 through a one-way clutch 24, a converter output shaft 26 connected with the turbine 23, and a lock-up clutch 27 for directly connecting the output shaft 26 with the engine output shaft 9 through the converter case 21.

An oil pump 11 driven by the engine output shaft 9 through the torque converter 20 is arranged between the torque converter 20 and the main transmission 30.

The main transmission 30 is provided with a front planetary gear mechanism 31 disposed close to the torque converter 20 on the converter output shaft 26 and a rear planetary gear mechanism 32 arranged away form the torque converter 20. The output shaft 26 is connected with a sun gear 31a of the front planetary gear mechanism 31 through a forward clutch 33 and with a sun gear 32a of the rear planetary gear mecha- nism 32 through a directly coupling clutch 34. The sun gear 31a is connected with a ring gear 32b of the rear planetary gear mechanism 32.

Between a ring gear 31b of the front planetary gear mechanism 31 and the transmission case 10 are disposed a first one-way clutch 35 and a low reverse brake 36 in parallel. Between the sun gear 32a of the rear planetary gear mechanism 32 and the transmission case 10 are disposed a second one-way clutch 37 and a 3-4 brake 38 in tandem and a coast brake 39 for engine braking is disposed in parallel with the clutch 37 and brake 38. Pinion carriers 31c and 32c of the front and rear planetary gear mechanisms 31, 32 are connected with each other and an intermediate gear 12 for transmitting the torque from the main transmission 30 to the sub-transmission 40 is connected thereto.

Thus, the main transmission 30 establishes low, middle and high speed stages for forward movement and one stage for reverse movement.

In detail, when only the forward clutch 33 is engaged, the torque from the output shaft 26 of the torque converter 20 is introduced into the sun gear 31a of the front planetary gear mechanism 31. In this case, the ring gear 31b is fixed to the case 10 through the first one-way clutch 35 so that the rotation of the output shaft 26 is transmitted to the intermediate gear 12 through the pinion carrier 31c of the front planetary gear mechanism 31 with a great speed reduction ratio to provide a low speed stage.

In this stage, when the 3-4 brake 38 is engaged, the sun gear 32a of the rear planetary gear mechanism 32 is fixed through the second one-way clutch 37. As a result, the power introduced into the ring gear 32b through the forward clutch 33 and the sun gear 31a from the converter output shaft 26 is transmitted to the intermediate gear 12 through the pinion carrier 32c with a speed reduction ratio smaller than that of the low speed stage to provide a middle speed stage.

In the middle speed stage, when the clutch 34 is engaged, the power from the output shaft 26 is introduced into the ring gear 32b of the rear planetary gear mechanism 32 through the forward clutch 33 and the sun gear 31a. The power is also introduced into the sun gear 32a of the rear planetary gear mechanism 32 through the direct clutch 34. Thus, the rear planetary mechanism 32 rotates integrally as a whole as if it is a single element so that the same rotational power as the output shaft 26 is transmitted to the intermediate gear 12 from the pinion carrier 32c to provide a high speed stage (or direct connection).

Then, if the forward clutch 33 is released and the direct clutch 34 is connected with the low reverse brake 36, the power of the converter output shaft 26 is introduced into the sun gear 32a of the rear planetary gear mechanism 32. Concurrently, the ring gear 31b is fixed so that the reverse rotational power is transmitted from the pinion carriers 31c and 32c to the intermediate gear 12 to provide the reverse stage.

In the low and middle speed stages in which the speed reduction is produced, the first and second one-way clutches 35 and 37 are raced to make the engine brake useless. In this case, it should be, however, noted that the low reverse brake 36 in parallel with the first one-way clutch 35 is engaged in the low speed stage and the coast brake 39 in parallel with the second one-way clutch 37 is engaged in the middle speed stage so that the engine brake can work effectively in the low and middle speed stages.

The sub-transmission 40 is provided with a single planetary gear mechanism 41. An intermediate gear 13, which keeps in mesh with the intermediate gear 12 of the main transmission 30, is connected with a ring gear 41a of the planetary gear mechanism 41. Between the ring gear 41a and a sun gear 41b is disposed a direct clutch 42, and between the sun gear 41b and the transmission case 10 are disposed a third one-way clutch 43 and reduction brake 44 in parallel with each other. Then, an output gear 14 is connected with a pinion carrier 41c of the planetary gear mechanism 41. The power is transmitted from the output gear 14 to right and left drive wheels 2a, 2b through the differential gear mechanism 5.

The sub-transmission 40 shifts the power introduced thereto from the main transmission 30 through the intermediate gears 12, 13 by two steps of low and high speed stages for forward movement and introduces the power to the output gear 14.

In detail, when the direct clutch 42 is released, the sun gear 41b is fixed by the third one-way clutch 43 or a speed reduction brake 44. As a result, the power from the intermediate gear 12 is reduced in rotation speed and introduced through the pinion carrier 41c into the output gear 14 to provide the low speed stage. In this case, when the speed reduction brake 44 is engaged, the engine brake works in the sub-transmission 40.

On the other hand, if the direct clutch 42 is engaged and the speed reduction brake 44 is released, when the ring gear 41a is connected with the sun gear 41b, the power from the intermediate gear 12 is introduced into the output gear 14 as it is so that the high speed stage (direct connection) is established.

Thus, the main transmission 30 provides three stages for forward movement end one stage for reverse movement. The sub-transmission 40 provides two stages of high and low speeds for each output of the main transmission 30. Therefore, the automatic transmission as a whole can get six different speed shift stages for forward movement and one reverse stage which is established through the reverse stage of the main transmission 30 and the low speed stage of the sub-transmission 40 in which the speed reduction brake 44 is engaged. In the illustrated embodiment, five shift stages are actually established among the possible combinations.

Table 1 shows operations of the respective frictional elements such as clutches and brakes in the five shift stages for forward movement and one reverse stage. In Table 1, (0) shows that an element involved is engaged when the engine brake works.

TABLE 1

| | MAIN TRANSMISSION | | | | | | |
|---|---|---|---|---|---|---|---|
| | SHIFT STAGE | DIRECT CLUTCH | FORWARD CLUTCH | 3-4 BRAKE | COAST BRAKE | LOW REVERSE BRAKE | FIRST ONEWAY CLUTCH | SECOND ONEWAY CLUTCH |
| 1 RANGE | LOW SPEED STAGE | | o | | | (o) | Lock | Free |
| 2 RANGE | LOW SPEED STAGE | | o | | | (o) | Lock | Free |
| 3 RANGE | MIDDLE SPEED STAGE | | o | o | o | | Free | Lock |
| 4 RANGE | MIDDLE SPEED STAGE | | o | o | o | | Free | Lock |
| 5 RANGE | HIGH SPEED STAGE | o | o | o | | | Free | Free |
| REVERSE RANGE | REVERSE STAGE | o | | | | o | Free | Free |

| | | SUB TRANSMISSION | | |
|---|---|---|---|---|
| | | SHIFT STAGE | DIRECT CLUTCH | REDUCTION BRAKE | THIRD ONEWAY CLUTCH |
| | 1 RANGE | LOW SPEED STAGE | | o | Lock |
| | 2 RANGE | HIGH SPEED STAGE | o | | Free |
| | 3 RANGE | LOW SPEED STAGE | | o | Lock |
| | 4 RANGE | HIGH SPEED STAGE | o | | Free |
| | 5 RANGE | HIGH SPEED STAGE | o | | Free |
| | REVERSE RANGE | LOW SPEED STAGE | | o | Free |

In the illustrated embodiment, there is provided a shift command producing means, in the form of a control unit 60, which is, referred hereinbelow to as an "ECU", for controlling the automatic transmission 4. The ECU 60 receives signals emitted from a throttle sensor 61 for sensing the degree to which the throttle valve 8 opens, signals emitted from a shift position sensor 62 for sensing a selected position of a select lever 15 handled by a driver, signals emitted from a first rotation sensor 63 for sensing numbers of revolutions of an input shaft of the main transmission 30, signals emitted from a second rotation sensor 64 for sensing numbers of revolutions of an output shaft of the main transmission 30 which is equal to numbers of revolutions of an input shaft of the sub-transmission 40, and signals emitted from a third rotation sensor 65 for sensing numbers of revolutions of an output shaft of the sub-transmission 40 which is equivalent to a vehicle speed, and produces signals for ordering shift changes, which is referred to as an "order signal" hereinbelow, according to those signals as well as controls shift changes by means of the switching means formed by the hydraulic pressure controller 50 to establish a shift stage indicated by the order signal.

Figure 3:
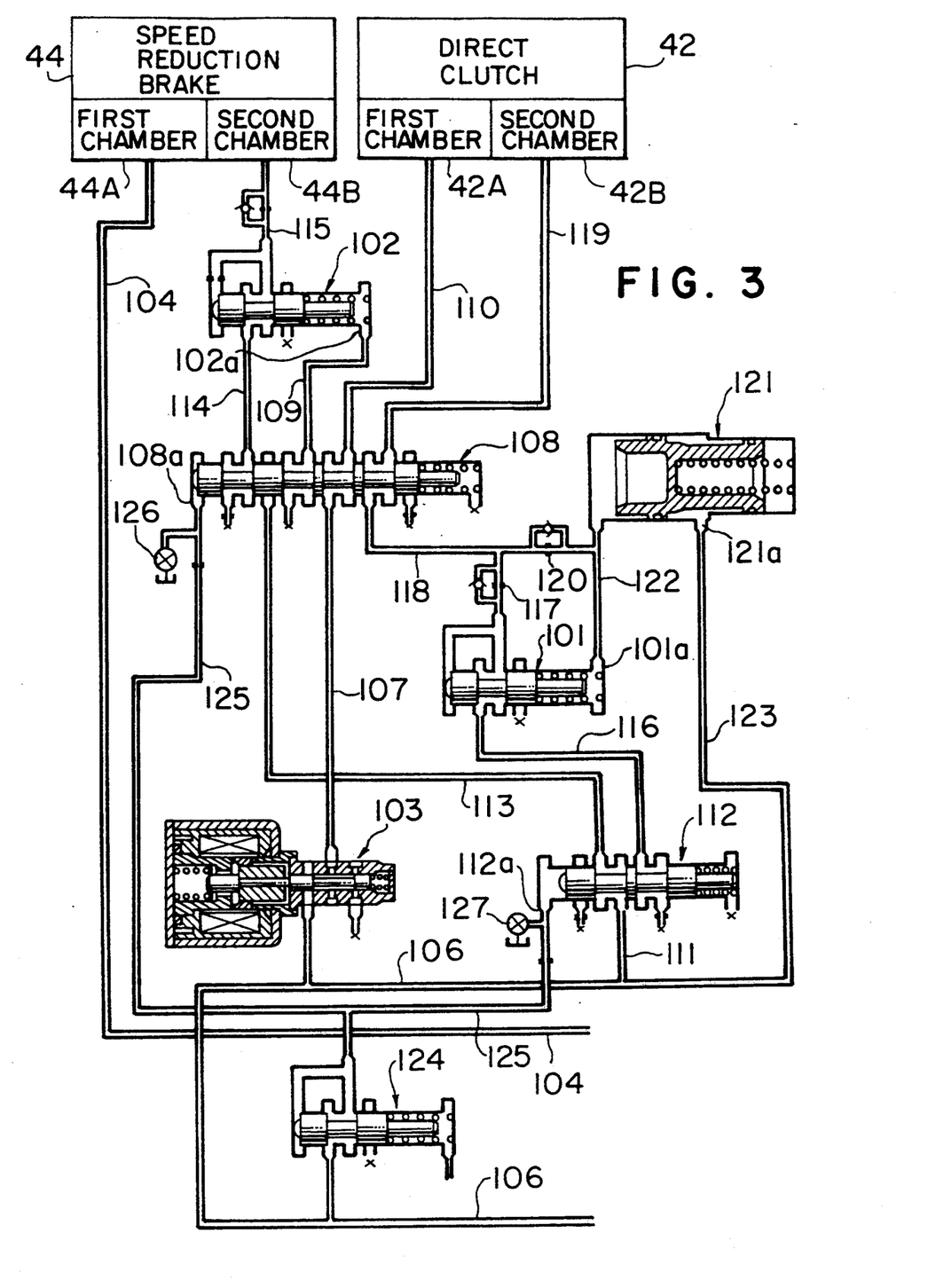
FIG. 3 shows a part of hydraulic control circuit for the sub-transmission.

A hydraulic pressure circuit for controlling engagement power of the sub-transmission 40 is explained hereinbelow with reference to FIG. 3. The direct clutch 42 is provided with a first hydraulic pressure chamber 42A and a second hydraulic pressure chamber 42B having a smaller area presented to the pressure than the chamber 42A. Similarly, the speed reduction brake 44 is provided with a first hydraulic pressure chamber 44A and a second hydraulic pressure chamber 44B having a smaller area presented to the pressure than the chamber 44A. In the circuit are disposed a direct clutch control valve 101 for controlling engaging hydraulic pressure applied to the first and second hydraulic pressure chamber 42A, 42B of the direct clutch 42, a speed reduction brake control valve 102 for controlling engaging hydraulic pressure applied to the smaller area hydraulic pressure chamber 44B of the speed reduction brake 44, and a linear solenoid valve 103. The hydraulic pressure is directly supplied to the first chamber 44A of the speed reduction brake 44 from a manual valve (not shown) through a reverse line 104 in a reverse range.

To the linear solenoid valve 103 is supplied the line pressure from a main line 106 as a basic control pressure. The valve 103 adjusts the basic control pressure in accordance with control signals emitted from ECU 60 and supplies it to a control port 102a of the speed reduction brake control valve 102 through a line 109 and to the first chamber 42A of the direct clutch 42 through a line 110, both from a first shift valve 108, to thereby control the hydraulic pressure in the first chamber 42A. The control valve 102 adjusts the line pressure which is introduced from the main line 106 through a line 111, a second shift valve 112, a line 113, the first shift valve 108 and a line 114 in accordance with the control pressure when the control pressure produced by the linear solenoid valve 103 is introduced into the control port 102a, and supplies the adjusted line pressure to the second chamber 44B of the speed reduction brake 44 through a line 115.

On the other hand, to the direct clutch control valve 101 is supplied the line pressure through the main line 106, a line 111, a second shift valve 112 and a line 116. The valve 101 adjusts the line pressure and selectively supplies the pressure to one of the first and second chambers 42A and 42B of the direct clutch 42 from a one-way orifice 117, a line 118 and a first shift valve 108 through a line 110 or a line 119.

To the control port 101a of the control valve 101 is supplied the engaging pressure for the chambers 42A and 42B of the clutch 42 as the control pressure through a line 122 on which a one-way orifice 120 and a fifth accumulator 121 are disposed. Thus, the engaging pressure is increased stepwise at the beginning by virtue of the fifth accumulator 121. To a back pressure port 121a of the accumulator 121 is supplied a back pressure through a main line 123 and a line 106.

The first and second shift valves 108, 112 are provided at their first ends with control ports 108a, 112a respectively. To these control ports 108a, 112a are connected a basic control pressure line 125 originating from a reducing valve 124. In the line 125 are disposed ON-OFF solenoid valves 126, 127 associated with the first and second shift valves 108, 112 respectively. When these ON-OFF solenoid valves 126, 127 are set to be on, they drain the control ports 108a, 112a of the shift valves 108, 112. Spools disposed in the shift valves 108, 122 are located at the left side, as viewed in FIG. 3, when the associated ON-OFF solenoid valves 126, 127 are on, and at the right side as viewed in FIG. 3, when the associated valves 126, 127 are off.

As is clear from the Table 1, for instance, in 3-2 shift down, shift changes are simultaneously accomplished both in the main transmission 30 and the sub-transmission 40. That is, in the main transmission 30, the 3-4 brake 38 is released to shift down from a middle speed shift stage to a high speed shift stage, while in the sub-transmission 40, the direct clutch 42 is engaged and the speed reduction brake 44 is released to shift up from a high speed shift stage and to a low speed shift stage. Thus, during 3-2 shift down, a shift change to increase a gear ratio and a shift change to decrease a gear ratio are simultaneously accomplished in the main transmission 30 and the sub-transmission 40. In this specific embodiment, the shift change control is accomplished as follows to prevent excessive shift change shock.

The ECU 60 calculates a gear ratio for the main transmission 30 in accordance with signals emitted from the first and second rotation sensors 63, 64 disposed at the input and output sides of the main transmission 30, and sets a target gear ratio of the sub-transmission 40 so that the gear ratio of sub-transmission 40 increases in proportion to reduction in the gear ratio of the main transmission 30. Then, the target gear ratio is compared with an actual gear ratio calculated on the basis of signals emitted from the second and third rotation sensors 64, 65 disposed at the input and output sides of the sub-transmission 40, to thereby feed-back control operation of the engagement of the direct clutch 32 engaged by the linear solenoid valve 103.

It should be noted that, in this specific embodiment, for the purpose of further reducing shock due to a shift change, a period of time for the operation of the sub-transmission 40 is adjusted so that the sub-transmission 40 starts its operation after the main transmission 30 starts its operation and ends its operation before the main transmission 30 ends its operation.

The shift change control according to the invention is explained hereinbelow. For instance, when a signal ordering 4-3 shift down, which is accomplished only by the sub-transmission 40, and a signal ordering 3-2 shift down, which is accomplished by both the main transmission 30 and the sub-transmission 40, are successively emitted, a shift change is controlled in accordance with a flow chart shown in FIG. 4.

Figure 4:
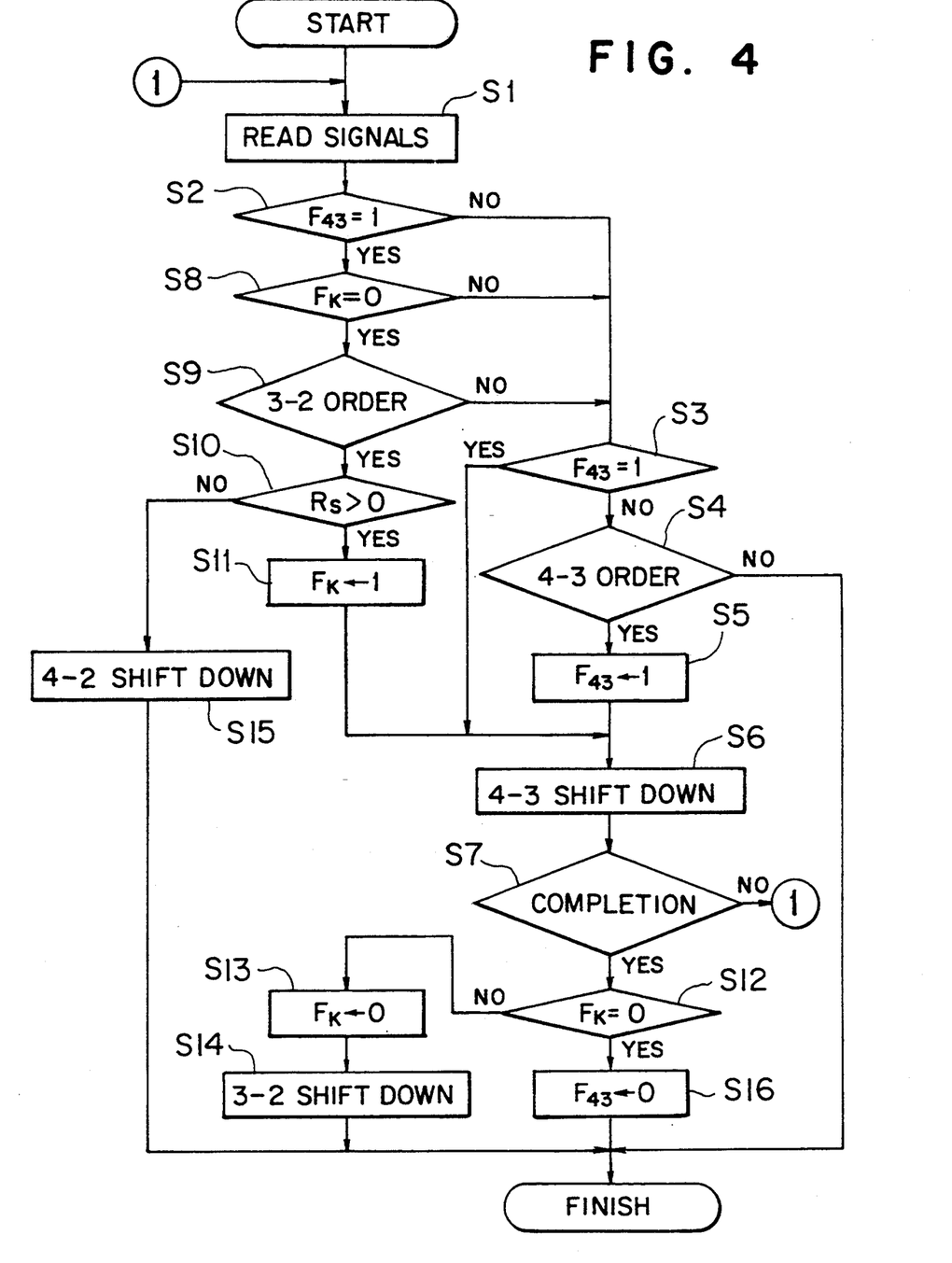
FIG. 4 is a flow chart of a control for 4-3 shift down.

The ECU 60 reads various signals in step S1, and then determines in step S2 whether 4-3 shift change ordering flag F43 is equal to one (1). This 4-3 shift change ordering flag F43 indicates that 4-3 shift change order signal is emitted, if the flag F43 is equal to one (1). This flag F43 is set to be equal to zero (0) in advance. Consequently, ECU 60 determines again in step S3 whether the flag F43 is set to be equal to one (1). However, since the flag F43 is set to be zero (0) in advance as aforementioned, ECU 60 forwards to step S4 in which ECU 60 determines whether a 4-3 shift down ordering signal is emitted. If a 4-3 shift down ordering signal is emitted, ECU 60 sets the flag F43 to be equal to one (1) in step S5 and accomplishes 4-3 shift down in step S6, and then judges in step S7 whether the 4-3 shift down is completed. If an answer of this judgment is NO, ECU 60 returns to step S1 and determines again in step S2 whether the flag F43 is equal to one (1). Since the flag F43 is set to be equal to one (1) in step S5, ECU 60 moves to step S8 where ECU 60 determines whether a flag FK is set to be equal to zero (0). This flag FK indicates that successive shift changes are accomplished if the flag FK is equal to one (1). Since the flag FK is set to be equal to zero (0) in advance, ECU 60 forwards to step S9 in which ECU 60 judges whether 3-2 shift down order signal is emitted.

If a 3-2 shift down order signal is already emitted, ECU 60 forwards to step S10, in which ECU 60 determines whether progress of a gear ratio RS of the sub-transmission 40 is greater than zero (0), namely determines whether the sub-transmission 40 actually accomplishes a shift change. The progress of a gear ratio RS is calculated on the basis of signals emitted from the second and third rotation sensors 64, 65.

Figure 5:
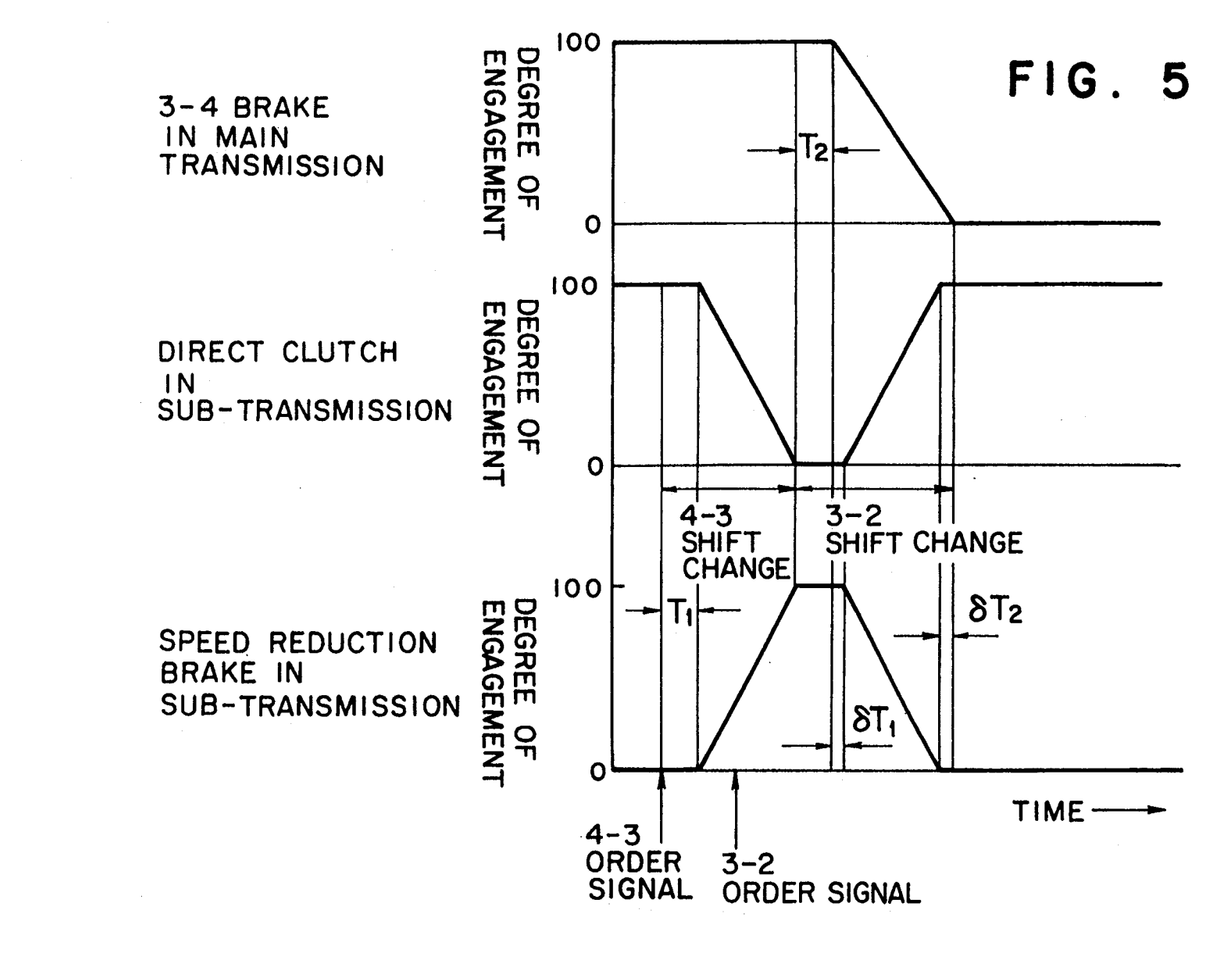
FIG. 5 is a graphical representation showing a relationship between a period of time for shift changing and engagement force when 3-2 shift down ordering signal is issued after the sub-transmission has started its operation according to a 4-3 shift down ordering signal.

As shown in FIG. 5, the progress of a gear ratio RS is greater than zero (0) when the engagement in the direct clutch 42 or the speed reduction brake 44 starts to change after time lag T1 has passed and the planetary gear mechanism 41 of the sub-transmission 40 actually starts its operation. Therefore, when a 3-2 shift down order signal is emitted after time lag T1 has passed, ECU 60 forwards from step S10 to step S11 in which the flag FK is set to be equal to one (1), and then accomplishes 4-3 shift down in step S6.

When ECU 60 determines in step S7 that 4-3 shift down is completed, ECU 60 forwards to step S12 in which ECU 60 judges whether the flag FK is set to be equal to zero (0). If the flag FK is not equal to zero (0), ECU 60 forwards to step S13 in which ECU 60 sets the flag FK to be equal to zero (0), and then forwards to step S14 to carry out 3-2 shift down.

Thus, as illustrated in FIG. 5, in the main transmission 30, the 3-4 brake 38 is released after time lag T2 has passed and then a shift change starts, while in the sub-transmission 40, the direct clutch 42 is engaged and the speed reduction brake 44 is released when an extremely short period of time δT1 has passed after the operation in the main transmission 30 is started. Then, when an extremely short period of time δT2 has passed after the operation in the sub-transmission 40 was completed, the release of the 3-4 brake 38 in the main transmission 30 is completed to establish 2nd shift stage.

On the other hand, if the gear ratio of the sub-transmission 40 changes to thereby increase the progress of a gear ratio RS when a 3-2 shift down order signal is emitted, ECU 60 moves from step S10 to step S15 in which 4-2 shift down is carried out.

Figure 6:
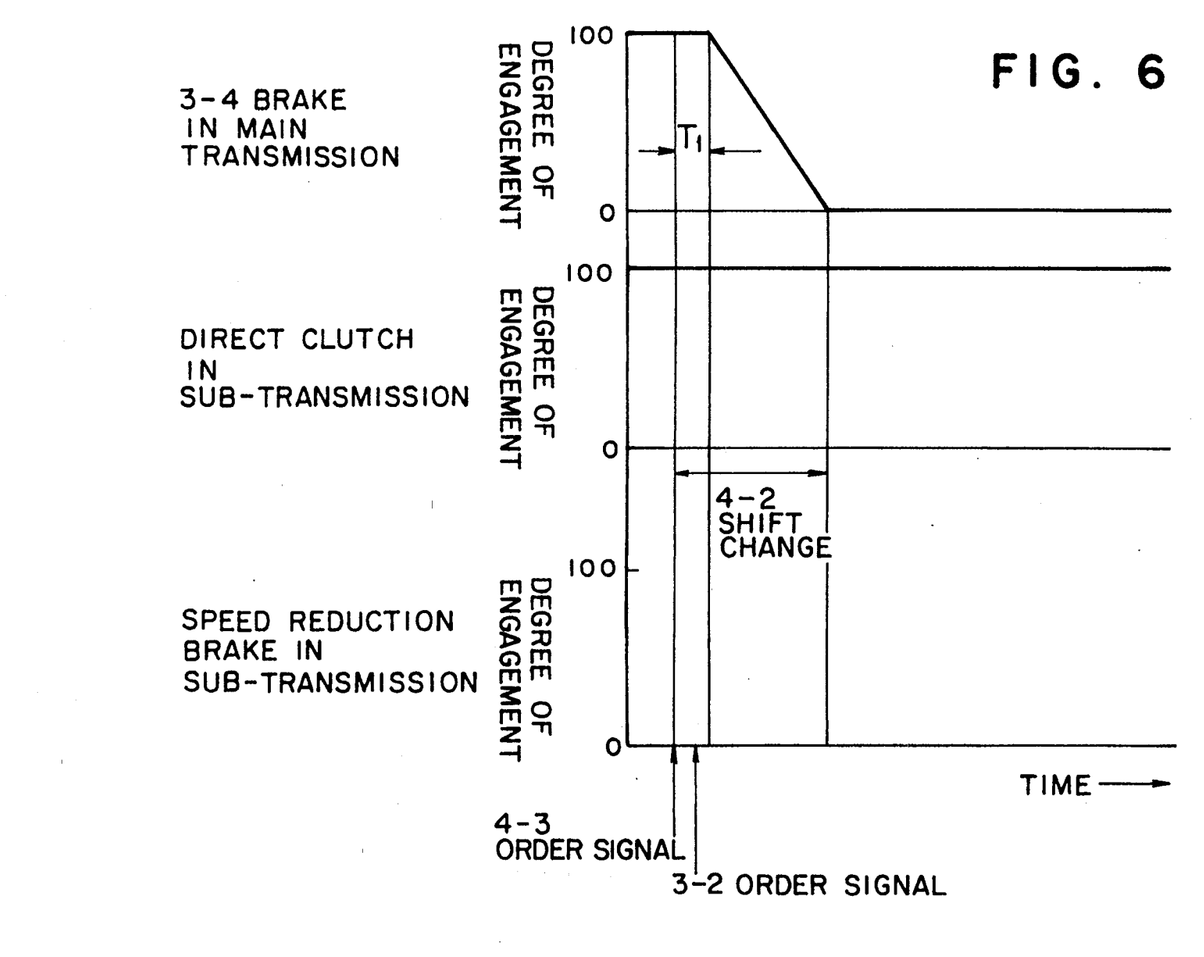
FIG. 6 is a graphical representation showing a relationship between a period of time for shift changing and engagement force when a 3-2 shift down ordering signal is issued before the sub-transmission starts its operation according to a 4-3 shift down ordering signal.

Thus, as illustrated in FIG. 6, only the 3-4 brake 38 in the main transmission 30 starts release movement after time lag T1 has passed, to establish the second shift stage without carrying out a shift change to establish the third shift stage. Thus, the second shift stage can be smoothly established.

If the flag FK is equal to zero (0) when 4-3 shift down is completed, the flag F43 is set to be equal to zero (0) in step S16. Thus, a shift change control is completed.

Figure 7:
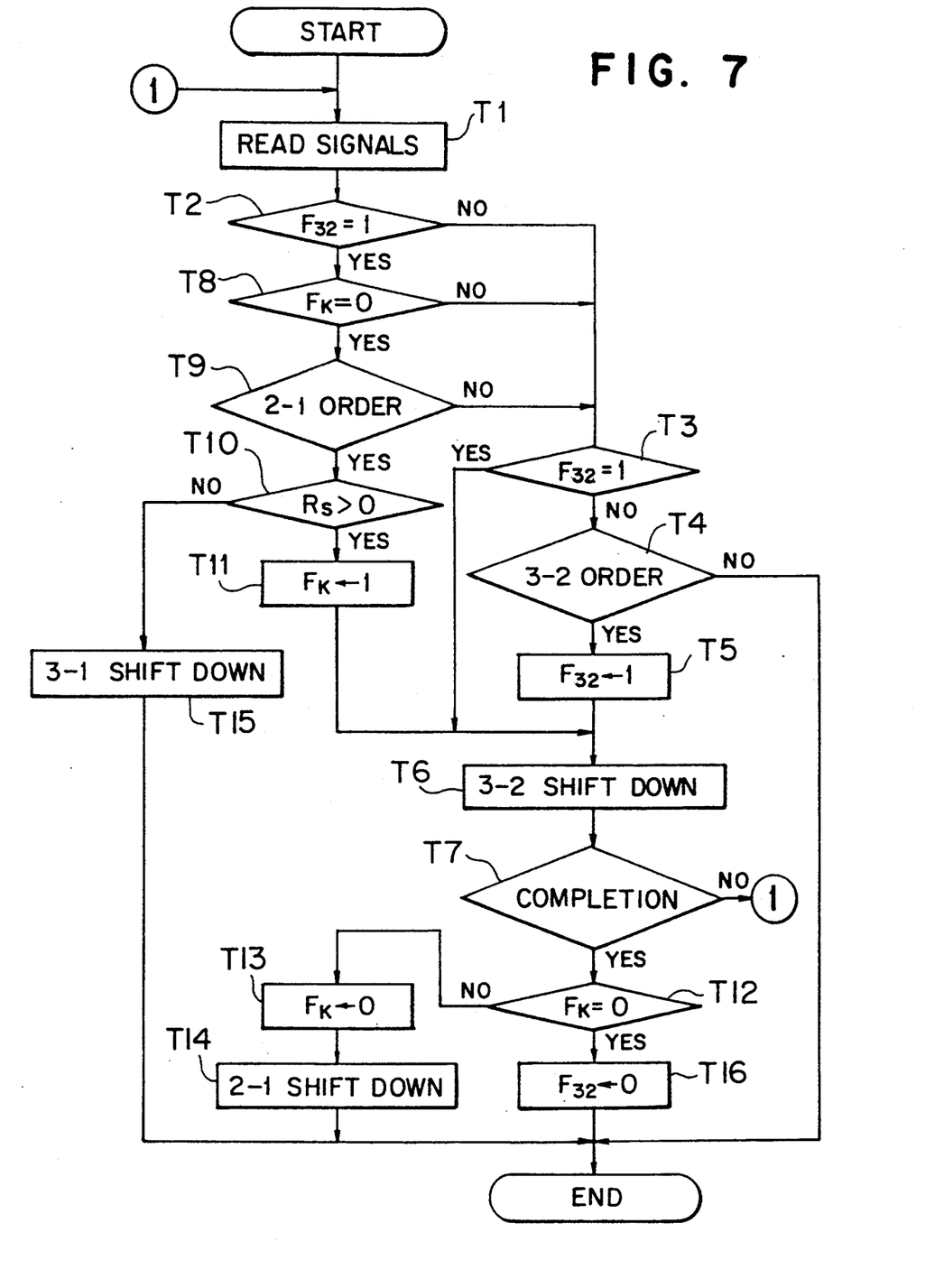
FIG. 7 is a flow chart of a control for 3-2 shift down.

On the other hand, for instance, when a signal ordering 3-2 shift down, which is carried out by both the main transmission 30 and the sub-transmission 40, and a signal ordering 2-1 shift down, which is carried out only by the sub-transmission 40, are successively emitted, a shift change control is carried out in accordance with a flow chart shown in FIG. 7.

The ECU 60 reads various signals in step T1, and then determines in step T2 whether 3-2 shift change ordering flag F32 is equal to one (1). This 3-2 shift change ordering flag F32 indicates that a 3-2 shift change order signal is emitted, if the flag F32 is equal to one (1). This flag F32 is set to be equal to zero (0) in advance. Consequently, ECU 60 determines again in step T3 whether the flag F32 is set to be equal to one (1). However, since the flag F32 is set to be zero (0) in advance as aforementioned, ECU 60 forwards to step T4 in which ECU 60 determines whether a 3-2 shift down ordering signal is emitted. If a 3-2 shift down ordering signal is emitted, ECU 60 sets the flag F32 to be equal to one (1) in step T5 and accomplishes 3-2 shift down in step T6, and then judges in step T7 whether the 3-2 shift down is completed. If an answer of this Judgment is NO, ECU 60 returns to step T1 and determines again in step T2 whether the flag F32 is equal to one (1). Since the flag F32 is set to be equal to one (1) in step T5, ECU 60 moves to step T8 where ECU 60 determines whether a flag FK is set to be equal to zero (0). This flag FK indicates that successive shift changes are accomplished if the flag FK is equal to one (1). Since the flag FK is set to be equal to zero (0) in advance, ECU 60 forwards to step T9 in which ECU 60 judges whether a 2-1 shift down order signal is emitted.

If a 2-1 shift down order signal is already emitted, ECU 60 forwards to step T10 in which ECU 60 determines whether progress of a gear ratio RS of the sub-transmission 40 is greater than zero (0), namely determines whether the sub-transmission 40 actually accomplishes a shift change.

Figure 8:
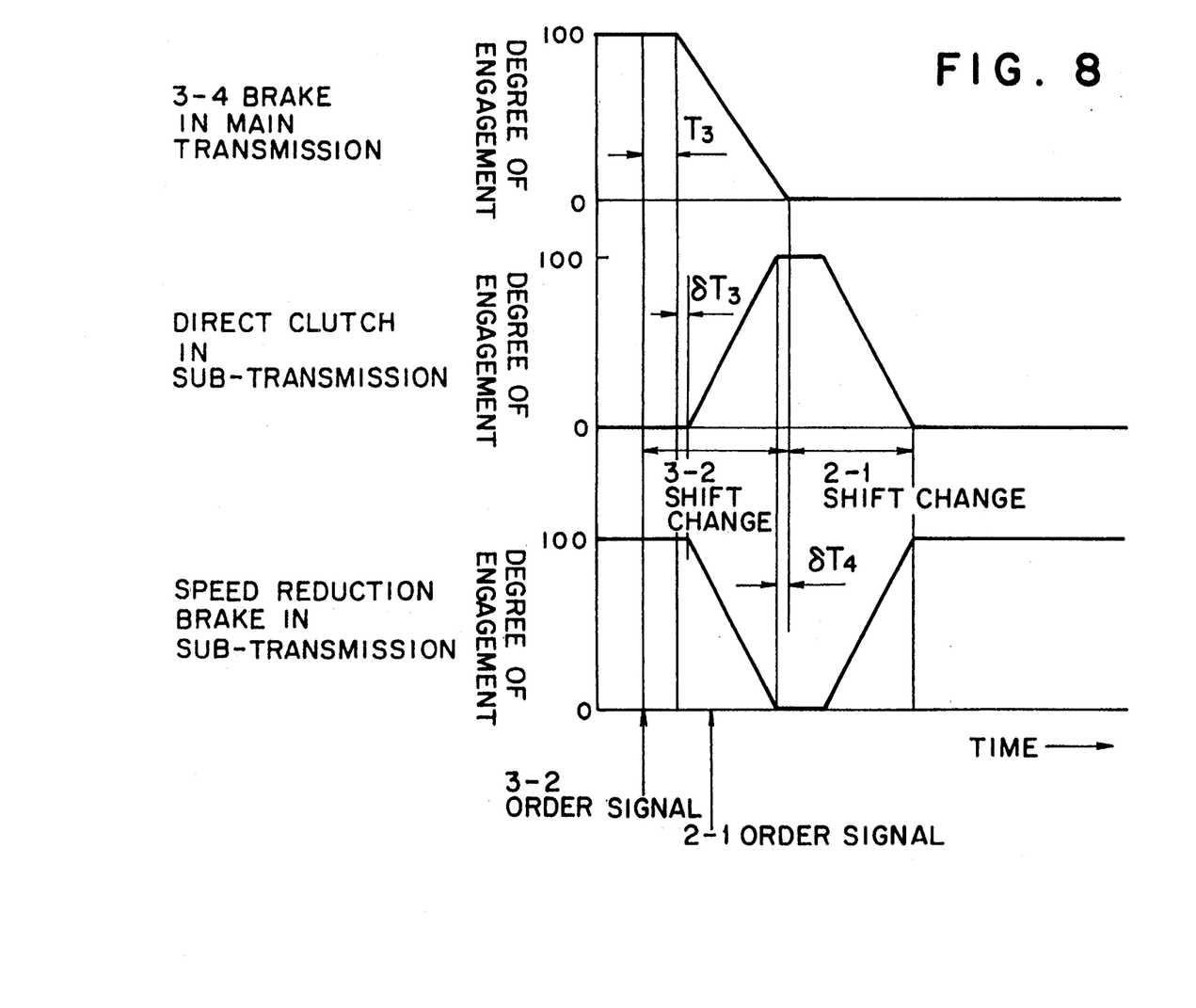
FIG. 8 is a graphical representation showing a relationship between a period of time for shift changing and engagement force when a 2-1 shift down ordering signal is issued after the sub-transmission has started its operation according to a 3-2 shift down ordering signal.

As shown in FIG. 8, the progress of a gear ratio RS is greater than zero (0) when the engagement in the direct clutch 42 or the speed reduction brake 44 starts to change after time lag T3 passed, namely the planetary gear mechanism 41 of the sub-transmission 40 actually starts its operation. Therefore, when a 2-1 shift down order signal is emitted after time lag T3 passed, ECU 60 forwards from step T10 to step T11 in which the flag FK is set to be equal to one (1), and then accomplishes 3-2 shift down in step T6.

Thus, as illustrated in FIG. 8, in the main transmission 30, the 3-4 brake 38 is released after time lag T3 has passed and then a shift change starts, while in the sub-transmission 40, the direct clutch 42 is engaged and the speed reduction brake 44 is released when an extremely short period of time δT3 has passed after the operation in the main transmission 30 started. Then, when an extremely short period of time δT4 has passed after the operation in the sub-transmission 40 was completed, the release of the 3-4 brake 38 in the main transmission 30 is completed to establish 2nd shift stage.

When ECU 60 determines in step T7 that 3-2 shift down is completed, ECU 60 forwards to step T12 in which ECU 60 judges whether the flag FK is set to be equal to zero (0). If the flag FK is not equal to zero (0), ECU 60 forwards to step T13 in which ECU 60 sets the flag FK to be equal to zero (0), and then forwards to step T14 to carry out 2-1 shift down.

Thus, as illustrated in FIG. 8, the direct clutch 42 in the sub-transmission 40 is released and the speed reduction brake 44 is engaged to thereby establish first shift stage.

On the other hand, if the gear ratio of the sub-transmission 40 changes to thereby increase the progress of a gear ratio RS when 3-2 shift down order signal is emitted, ECU 60 moves from step T10 to step T15 in which 3-1 shift down is carried out.

Figure 9:
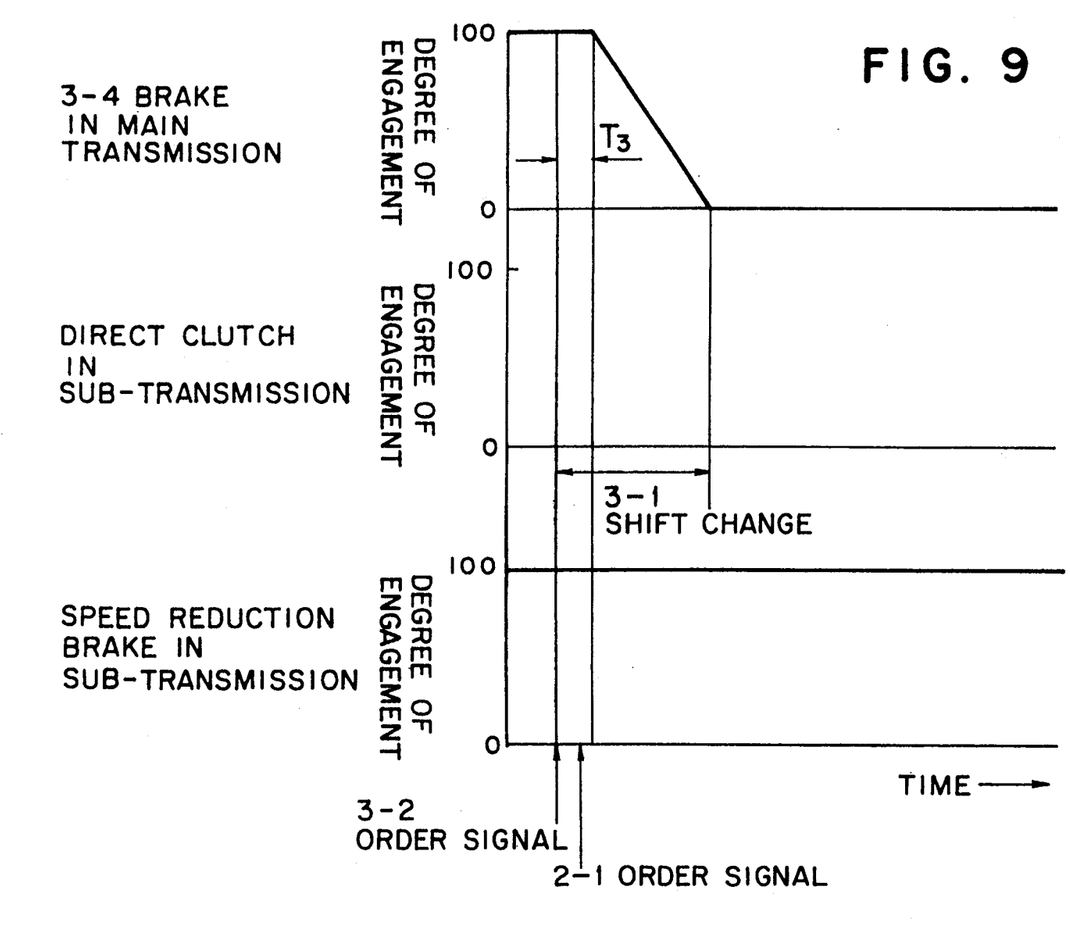
FIG. 9 is a graphical representation showing a relationship between a period of time for shift changing and engagement force when a 2-1 shift down ordering signal is issued before the sub-transmission has started its operation according to a 3-2 shift down ordering signal.

Thus, as illustrated in FIG. 9, only the 3-4 brake 38 in the main transmission 30 starts release movement after time lag T3 has passed, to establish a first shift stage without carrying out a shift change to establish a second shift stage. Thus, a first shift stage can be smoothly established.

If the flag FK is equal to zero (0) when 3-2 shift down is completed, the flag F32 is set to be equal to zero (0) in step T16. Thus, a shift change control is completed.

A control similar to the aforementioned control is carried out in shift up changes. When a signal ordering 1-2 shift up, which is carried out only by the sub-transmission 40, and a signal ordering 2-3 shift up, which is carried out by both the main transmission 30 and the sub-transmission 40, are successively emitted, 2-3 shift up is carried out after 1-2 shift up is completed. On the other hand, if a signal ordering 2-3 shift up is emitted before the operation in the sub-transmission 40 starts, then 1-3 shift up is carried out without 1-2 shift up being carried out.

When a signal ordering 2-3 shift up, which is carried out by both the main transmission 30 and the sub-transmission 40, and a signal ordering 3-4 shift up, which is carried out only by the sub-transmission 40, are successively emitted, 3-4 shift change is carried out after 2-3 shift change is completed, if the 3-4 shift up ordering signal was emitted after the operation in the sub-transmission 40 started, while 2-4 shift up is carried out without 2-3 shift up being carried out, if the 3-4 shift up ordering signal was emitted before the operation of the sub-transmission 40 started.

When five shift stages for forward movement is adopted among six shift stages for forward movement in the automatic transmission 4 as illustrated in FIG. 1, four types of shift selection can be selected as indicated in Table 2. These types of shift selection are type 1, wherein low speed stage of the sub-transmission 40 is not used in high speed stage of the main transmission 30; type 2 wherein high speed stage of the sub-transmission 40 is not used in middle speed stage of the main transmission 30; type 3 wherein low speed stage of the sub-transmission 40 is not used in middle speed stage of the main transmission 30; and type 4 wherein high speed stage of the sub-transmission 40 is not used in low speed stage of the main transmission 30. The aforementioned embodiment corresponds to the type 1.

down ordering signal was emitted before the operation of the main transmission 30 started.

For instance, when a signal ordering 3-2 shift down, which is carried out by both the main transmission 30 and the sub-transmission 40, and a signal ordering 2-1 shift down, which is carried out only by the sub-transmission 40, are successively emitted, 2-1 shift change is carried out after 3-2 shift change is completed, if the 2-1 shift down ordering signal was emitted after the operation in the sub-transmission 40 started, while 3-1 shift down is carried out without 3-2 shift down being carried out, if the 2-1 shift down ordering signal was emitted before the operation of the sub-transmission 40 started.

Also, when a signal ordering 1-2 shift up, which is carried out only by the sub-transmission 40, and a signal ordering 2-3 shift up, which is carried out by both the main transmission 30 and the sub-transmission 40, are successively emitted, 2-3 shift up is carried out after 1-2 shift up is completed, if the signal ordering 2-3 shift up was emitted after the operation in the sub-transmission 40 started, while 1-3 shift up is carried out without 1-2 shift up being carried out, if the 2-3 ordering signal was emitted before the operation of the sub-transmission 40 started.

When a signal ordering 2-3 shift up, which is carried out by both the main transmission 30 and the sub-transmission 40, and a signal ordering 3-4 shift up which is carried out only by the sub-transmission 40, are successively emitted, 3-4 shift change is carried out after 2-3 shift change is completed, if the 3-4 shift up ordering signal was emitted after the operation in the main transmission 30 started, while 2-4 shift up is carried out without 2-3 shift up being carried out, if the 3-4 shift up ordering signal was emitted before the operation of the main transmission 30 started.

When the aforementioned type 3 or 4 is selected, shift changes are controlled in a similar way as aforementioned.

The control mentioned so far can be applied to an

TABLE 2

| | MAIN TRANSMISSION | | | | | |
|---|---|---|---|---|---|---|
| | LOW SPEED STAGE | | MIDDLE SPEED STAGE | | HIGH SPEED STAGE | |
| | SUB TRANSMISSION | | | | | |
| | LOW SPEED STAGE | HIGH SPEED STAGE | LOW SPEED STAGE | HIGH SPEED STAGE | LOW SPEED STAGE | HIGH SPEED STAGE |
| TYPE 1 | 1ST | 2ND | 3RD | 4TH | | 5TH |
| TYPE 2 | 1ST | 2ND | 3RD | | 4TH | 5TH |
| TYPE 3 | 1ST | 2ND | | 3RD | 4TH | 5TH |
| TYPE 4 | 1ST | | 2ND | 3RD | 4TH | 5TH |

(THE NUMBER MEANS EACH SHIFT STAGE)

The invention can apply to the types 2, 3 and 4. For instance, when the invention is applied to the type 2, a gear ratio increases in the main transmission 30 and a gear ratio in the sub-transmission 40 decreases or vice versa in 2-3 or 3-2 shift change. For instance, when a signal ordering 4-3 shift down, which is carried out only by the main transmission 30, and a signal ordering 3-2 shift down, which is carried out by both the main transmission 30 and the sub-transmission 40, are successively emitted, 3-2 shift change is carried out after 4-3 shift change is completed, if the 3-2 shift down ordering signal was emitted after the operation in the main transmission 30 started, while 4-2 shift down is carried out without 4-3 shift down being carried out, if the 3-2 shift automatic transmission in which gear ratios increase both in a main transmission and a sub-transmission or gear ratios decrease both in the two transmissions when shift changes are carried out, and also to an automatic transmission having a single transmission.

Although the present invention has been explained with reference to specific, preferred embodiments, one of ordinary skill in the art will recognize that modifications and improvements can be made while remaining within the scope and spirit of the present invention. The scope of the present invention is determined solely by the appended claims.

What is claimed is:

1. A control system for an automatic transmission comprising:

a torque converter to which engine power is introduced;

a shift gear mechanism for changing an output of said torque converter to vary a vehicle speed;

a plurality of frictional elements for switching a power transmitting path in said shift gear mechanism;

switching means for controlling hydraulic pressure to selectively engage said frictional elements and perform a shift operation;

sensing means for sensing the shift operation of the shift gear mechanism; and shift command producing means for (1) producing a shift command to establish a desired shift stage, (2) controlling the switching means in accordance with the shift command to make the shift operation, and (3) performing a skipped shift operation, in which a shift operation beyond consecutive shift stages is made, when a second shift command is produced after a first shift command and when a shift operation is not started based on the first shift command.

2. A control system in accordance with claim 1, wherein said sensing means having three sensors to sense revolution speeds of an input shaft of said main transmission, an output shaft of said main transmission and an output shaft of said sub-transmission.

3. A control system in accordance with claim 1, wherein said shift gear mechanism comprises a main transmission in which at least some of said frictional elements are selectively frictional elements with each other among a plurality of frictional engaged to switch said power transmitting path and thereby change said output of said torque converter to vary said vehicle speed and a sub-transmission in which at least some others of said frictional elements are selectively engaged to switch said power transmitting path and thereby change an output of said main transmission.

* * * * *